United States Patent [19]

Goenner

[11] Patent Number: 5,029,312
[45] Date of Patent: Jul. 2, 1991

[54] AUTOMATIC PORTRAITURE PRINTER CONTROL SYSTEM

[75] Inventor: Gary L. Goenner, Chaska, Minn.

[73] Assignee: Lifetouch National School Studios Inc., Minneapolis, Minn.

[21] Appl. No.: 476,894

[22] Filed: Feb. 8, 1990

[51] Int. Cl.$^5$ .............................................. G03B 27/80
[52] U.S. Cl. ........................................ 355/38; 355/41; 355/77; 355/40
[58] Field of Search ................... 355/38, 41, 68, 77, 355/40; 354/105–109, 412, 21

[56] References Cited

U.S. PATENT DOCUMENTS

| | | | |
|---|---|---|---|
| 3,471,242 | 10/1969 | Nichols | 355/38 |
| 3,527,540 | 9/1970 | Bowker et al. | 355/38 |
| 3,694,074 | 9/1972 | Huboi et al. | 355/38 |
| 3,708,676 | 1/1973 | Huboi et al. | 355/38 X |
| 3,829,214 | 8/1974 | Zahn et al. | 355/38 X |
| 3,947,110 | 3/1976 | Yamada | 355/38 |
| 4,217,648 | 8/1980 | Thurm et al. | 355/88 X |
| 4,244,653 | 1/1981 | Asai et al. | 356/404 |
| 4,353,641 | 10/1982 | Merlo | 355/68 X |
| 4,561,768 | 12/1985 | Fürsich et al. | 355/38 |
| 4,562,462 | 12/1985 | Egan | 350/173 X |
| 4,574,692 | 3/1986 | Wahli | 355/40 X |
| 4,577,961 | 3/1986 | Terashita | 355/38 X |
| 4,589,766 | 5/1986 | Fürsich et al. | 355/38 |
| 4,629,312 | 12/1986 | Pearce et al. | 355/41 X |
| 4,641,959 | 2/1987 | Terashita | 355/77 |
| 4,657,378 | 4/1987 | Hope et al. | 355/38 |
| 4,769,695 | 9/1988 | Terashita | 355/38 X |
| 4,797,713 | 1/1989 | Terashita et al. | 355/38 X |
| 4,862,200 | 8/1989 | Hicks | 354/105 X |
| 4,965,626 | 10/1990 | Robinson et al. | 355/40 |
| 4,975,732 | 12/1990 | Robinson et al. | 355/40 |

*Primary Examiner*—L. T. Hix
*Assistant Examiner*—D. Rutledge
*Attorney, Agent, or Firm*—Kinney & Lange

[57] ABSTRACT

An automatic portraiture printer control system includes a camera system which exposes a frame of a photosensitive medium to an image. At generally the time of exposure, the camera system stores image information associated with each frame exposed in machine readable form. A printer control system analyzes the exposed frame to determine image color density values on a point-by-point basis. The printer control system reads the stored image information and determines proper printing parameters based upon the image information and the image color density values. The image is printed on photographic print paper based upon the printing parameters.

63 Claims, 6 Drawing Sheets

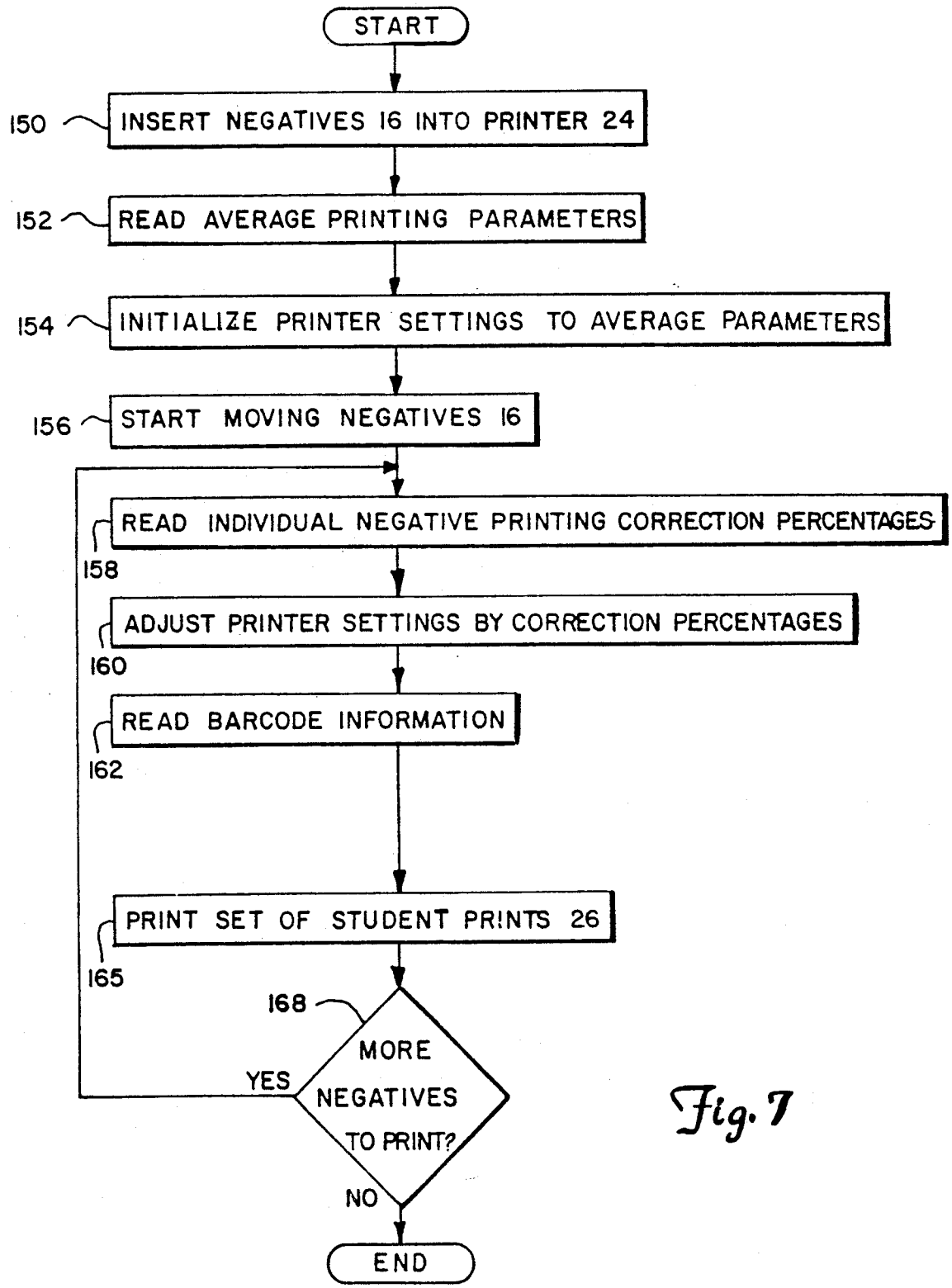

AUTOMATIC PORTRAITURE PRINTER CONTROL SYSTEM

BACKGROUND OF THE INVENTION

1. Field of the Invention.

This invention relates to a method of controlling color and density correction values in portraiture printer control systems.

2. Description of the Prior Art

Film negatives have been analyzed to determine proper color and density corrections in the photographic field for at least thirty years. At first, the analysis was based upon large area transmission density of red, green and blue, sometimes referred to as "LATD" measurements. The idea was that the overall color content of any given print should integrate to gray. Based upon the LATD measurements, the red, green and blue exposure times would be adjusted so that the overall integrated color of the print was gray.

By the 1960's, it was recognized that integration to gray did not completely handle all possible situations. Certain types of photographs would not print properly with integration-to-gray. These were typically referred to as "color failure" and "density failure" negatives. An example of a failure negative is a child in a red snowsuit standing in front of a snow bank. That type of scene does not have equal amounts of red, green and blue. In addition, the subject in the center of the photograph is abnormally dark compared to the background. If integration-to-gray were used solely to control exposure time, the child's face would be off-color and may be either abnormally dark or abnormally light. Other examples of failure negatives include beach and snow scenes, photographs taken using flash photography, and photographs taken under artificial lighting.

During the 1970's and into the early 1980's, a number of companies (most notably Kodak, Gretag, Agfa, Pako and Fuji Photo) developed automatic color and density analysis equipment which controlled photographic printers. For example, Terashita U.S. Pat. No. 4,641,959 discloses an automatic color printing control system. In general, these systems divided each negative into areas or pixels and performed some form of computer analysis on those pixels to determine the proper density and color corrections.

The Terashita patent also discusses the desirability of locating regions of flesh tones. Terashita discloses a method of detecting a principal subject for determining printing exposures. An individual visually inspects each negative and determines a region containing the principal subject. If the region contains flesh tones, printer exposure times are adjusted to create prints having more accurate flesh tones. In this method, however, the individual is relatively inefficient and prone to errors. The method used in the Terashita patent and the other color and density analysis techniques developed in the 1970's and early 1980's dealt with amateur photography, where the range of subjects and scenes which could be photographed was virtually unlimited. Thus, the negative analysis which was performed had to be very generalized.

In portrait photography, the range of subjects and scenes is much more limited than in amateur photography. In addition, the most important part of portrait photography is obtaining prints having proper flesh tones.

Hopson U.S. Pat. No. 4,422,745 entitled "Camera System" discloses a method of controlling the printing process for portraits. The camera system is used to take portraits of a large number of individuals such as students for school pictures. The camera system records bar code information on the exposed film alongside each image. That bar code information relates, for instance, to order information, student number and the like. This information can be used to control the number and size of prints produced. The student number is written alongside the print to aid in distribution.

Although the Hopson patent substantially reduces the labor required of a photographer to record information relating to orders and student numbers, it does not simplify the method of locating the principal subject in each portrait for determining printing parameters needed for obtaining prints having correct flesh tones.

The prior art of portrait photography lacks a simple method of automatically controlling a photographic printer to produce prints having proper flesh tones in their principal subjects.

SUMMARY OF THE INVENTION

The present invention is an automatic portraiture printer control system and method which simplifies the creating of portraiture prints having proper color tones. A camera system used by the photographer exposes a frame of a photosensitive medium to an image and stores image information associated with the exposed frame. The image information is stored in machine readable form at the time the photographs are taken. Prior to printing, a printer control system reads the stored image information and analyzes the exposed frame to determine image color density values on a point-by-point basis. The system determines printing parameters based upon the image information and the image color density values. A printer prints the image on photographic print paper based upon the printing parameters so that the resulting portrait has proper color tones.

In a preferred embodiment, the camera system writes the image information as a bar code alongside the exposed frame. The image information includes shooting distance, skin tone, scene type, and pose type. A bar code reader reads the image information and a scanner scans the image with photocells to determine the color density values. The system then locates a principal subject within the image based upon the image information and the color density values. In portraiture photography, the principal subject is a human face. The color density values within the face location are averaged to obtain printing parameters for the image. The printing parameters are thereby weighted to generate portraiture prints having proper flesh tones.

In an alternative embodiment, the image information is stored on a job ticket. The camera system stores a reference number as a bar code alongside the exposed frame. The reference number corresponds to the particular job ticket containing the related image information.

BRIEF DESCRIPTION OF THE DRAWINGS

FIG. 7 is a flow chart illustrating the steps performed by a computer controlled printer.

DETAILED DESCRIPTION OF THE PREFERRED EMBODIMENTS

Figure 1:
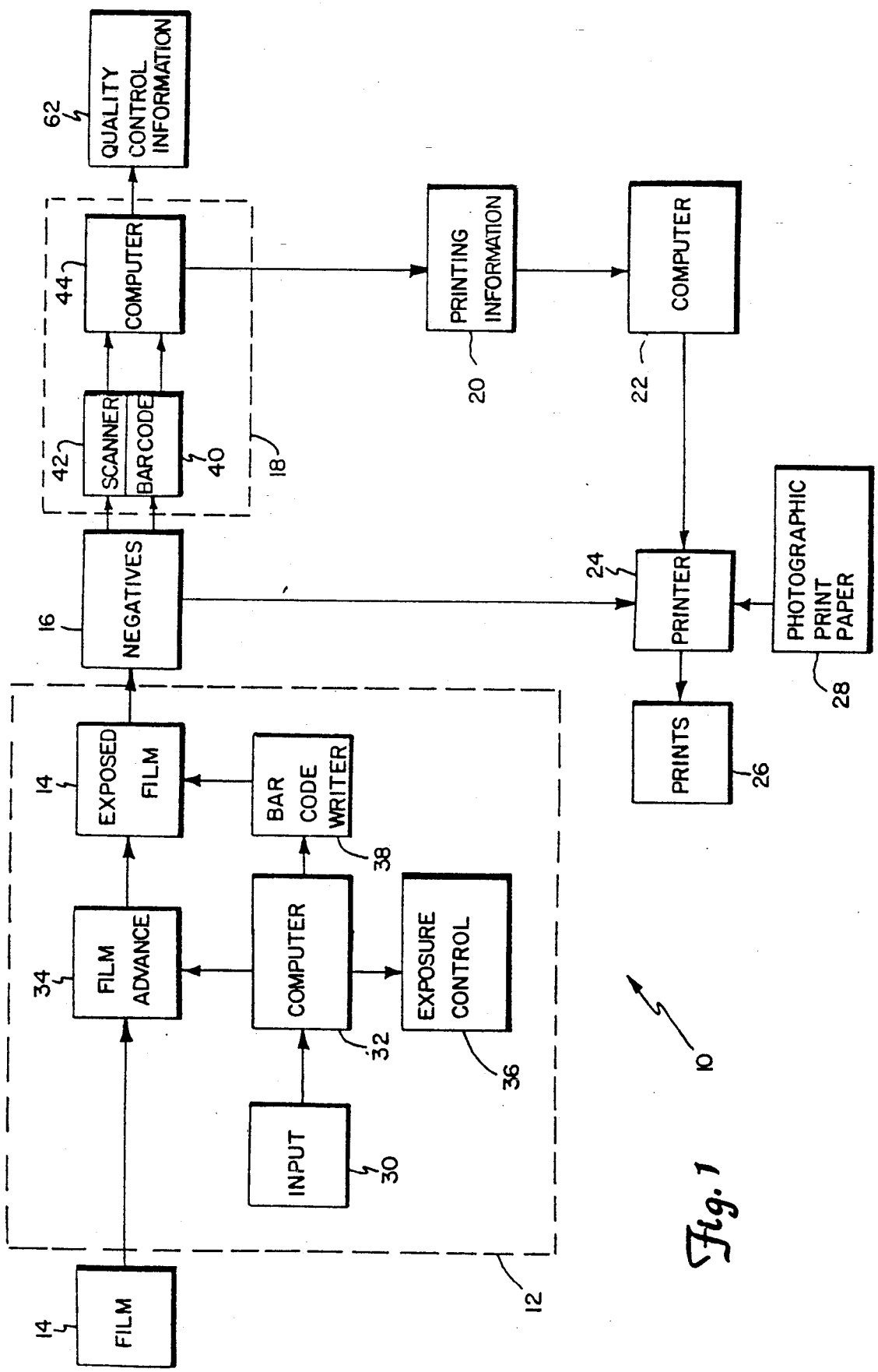
FIG. 1 is a diagram of an automatic portraiture photographic printer control system in accordance with the present invention.

FIG. 1 is a block diagram illustrating an automatic portraiture photographic printer control system 10 in accordance with the present invention. System 10 includes camera 12, film 14, negatives 16, analyzing system 18, printing information 20, computer 22, printer 24, prints 26 and photographic print paper 28. Camera 12 is transported by a photographer to various grade schools, junior high schools and senior high schools for setting up a portable studio. The photographer takes portrait photos of students in each school.

Camera 12 includes input 30 and computer 32 which controls film advance 34, exposure control 36, bar code writer 38, and performs various other camera operations. The photographer enters information into computer 32 through input 30 for controlling the operation of camera 12. In one preferred embodiment, input 30 is a keypad coupled to computer 32 by which the photographer enters information into computer 32. Other methods of input may also be used.

Film 14 is inserted into camera 12. As film 14 advances through camera 12, bar code writer 38 writes selected image information as a bar code alongside each frame on film 14. After exposure, film 14 is developed to produce a roll of film containing negatives 16 which are then placed in analyzing system 18.

Bar code reader 40 reads the bar code information alongside each negative and scanner 42 scans the corresponding negative to digitize its image. Computer 44 then determines printing control parameters from the digitized image and the image information, and transfers related printing information 20 computer 22. Printer 24 creates prints 26 from negatives 16 on photographic print paper 28 based upon printing information 20. Since obtaining proper flesh tones is so important in portraiture photography, analyzing system 18 weights printing information 20 such that printer 24 is adjusted to generate prints 26 having proper flesh tones.

Alternatively, prints 26 may be created from a variety of printer types. These types include, among others, inkjet and color laser printers, and photographic print paper 28 is replaced with any hard copy material suitable for use with the selected printer type. Prior to taking the student photos, the photographer takes a photograph of a calibration board. The photographer enters a shooting distance corresponding to the distance between camera 12 and a student to be photographed. The shooting distance is recorded alongside the frame exposed to the calibration board. The calibration board is used to calibrate studio lighting intensity levels.

Next, the photographer takes portraits of each individual student. Each student may order different packages of photographs. These packages generally include, among others, a selected number of 8"×10", 5"×7" and wallet size prints. Typically, each school selects a common scene and pose type for their student's portraits. The scene type selection can include solid color backgrounds, nature scenes, and a variety of indoor scenes. The pose selection can include sitting, standing, full-length, head and shoulder, and close-up shots.

In one embodiment, the selected scene type and pose type are recorded alongside the frame exposed to the calibration board by bar code writer 38.

However, if the scene and pose types vary from one student photo to the next, it is preferable to record the scene and pose type alongside each exposed frame. Prior to taking each student photo, the photographer enters image information relating to each exposed frame. The image information includes a portrait style or pose, scene type, and skin tone. Skin tone information identifies a general skin color of the student and aids in identifying proper flesh tones during printing. The image information entered by the photographer is recorded by bar code writer 38 alongside each exposed frame.

In an alternative embodiment, the image information is stored on a job ticket. The bar code writer 38 writes a reference number as a bar code alongside each exposed frame. The reference number corresponds to the particular job ticket containing the related image information.

Figure 2:
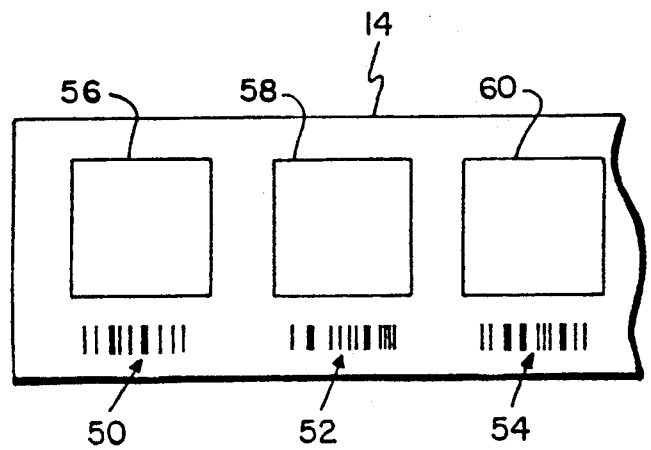
FIG. 2 is a view of a portion of exposed film having bar code information written alongside each frame.

FIG. 2 illustrates a portion of film 14 after exposure and having bar code information 50, 52, and 54 written alongside frames 56, 58 and 60, respectively.

After a roll of film is completed, the photographer takes exposed film 14 from camera 12 and develops film 14 to produce a roll of film containing negatives 16. Each negative created corresponds to an individual frame of exposed film 14. The exposed image and the bar code information for each frame is transferred to the corresponding negative. The film containing negatives 16 is then placed into analyzing system 18.

Figure 3:
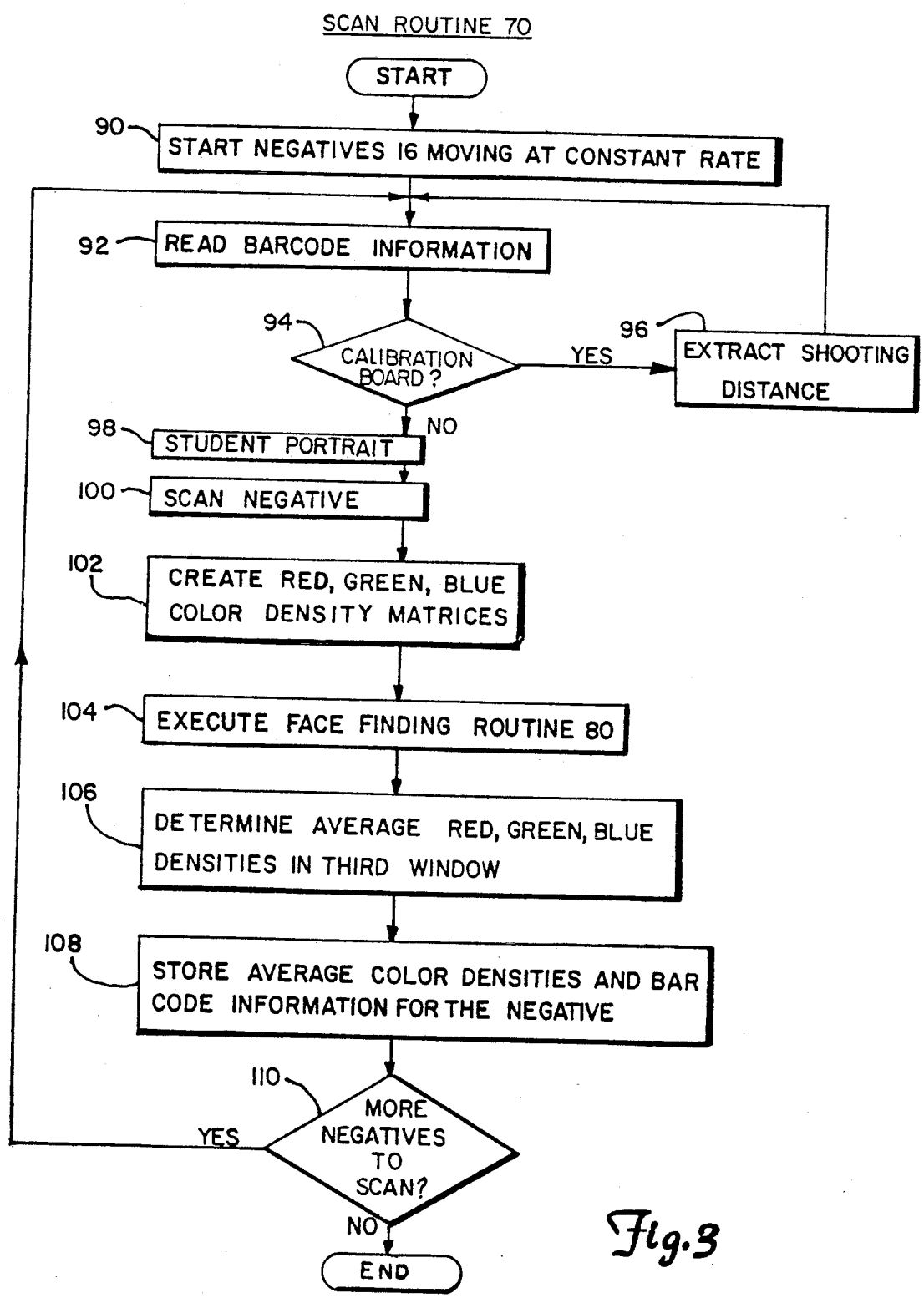
FIG. 3 is a flow chart illustrating the steps performed by a scan routine.

Analyzing system 18 includes bar code reader 40, scanner 42, and computer 44. FIG. 3 is a flow chart illustrating the steps performed for each negative by analyzing system 18 while computer 44 executes scan routine 70, indicated by blocks 90–110. Negatives 16 are fed through system 18 at a constant rate, such as 40 feet per minute. Bar code reader 40 reads the bar code information for that negative. If the bar code information indicates the negative is an image of the calibration board, scan routine 70 extracts the shooting distance from the bar code information and stores its value in random access memory (RAM). If the bar code information also includes a scene type and pose type, that information is also stored in RAM. The shooting distance, and possibly the scene type and pose type, correspond to subsequent negatives and are used until scan routine 70 encounters another calibration board and reads new values. Bar code reader 40 then looks for the next bar code. If the bar code information corresponds to a student's portrait, scan routine 70 extracts the image information and stores it in RAM.

Alternatively, if the image information is stored on a job ticket, bar code reader 40 reads the reference number. In a preferred embodiment, the image information is extracted from the job ticket by any known method and is stored in a data base coupled to computer 44. Analyzing system 18 retrieves the image information from the data base which corresponds to the reference number read by bar code reader 40 and stores the image information in RAM.

Next, scanner 42 scans the corresponding negative. Scanner 42 includes a series of photo cells which divide the negative into individual elements or pixels 74. FIG.

Figure 4:
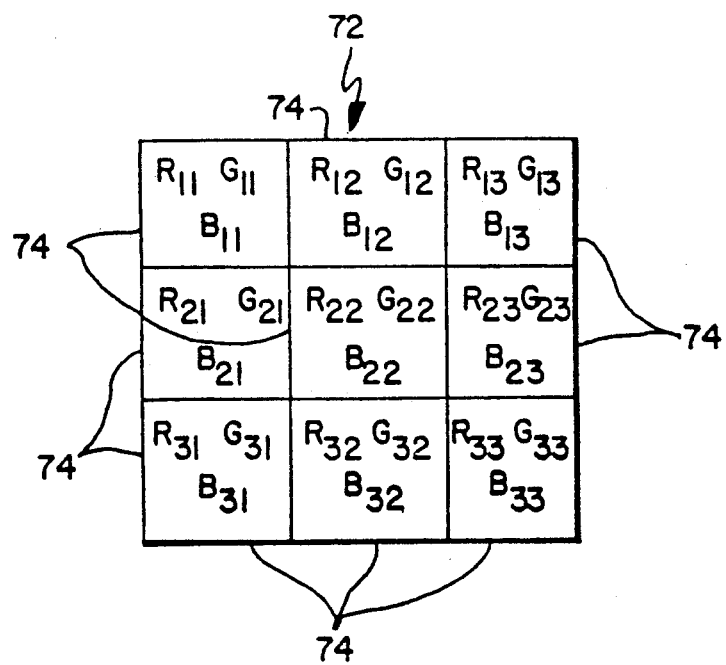
FIG. 4 is a view of a negative divided into pixels with each pixel having associated red, green, and blue densities.

4 illustrates a negative 72 divided into 9 pixels. In the preferred embodiment, scanner 42 divides negative 72 into greater than 400 pixels, but for ease of illustration and discussion, the simplified example of FIG. 4 will be used. The photo cells determine red, green, and blue color densities for each pixel 74. For example, $R_{11}$, $G_{11}$, and $B_{11}$ are color densities for one pixel 74. As the photo cells determine the red, green and blue densities, these values are stored as matrices in RAM. Three matrices are created, one for each color. Each matrix has one element per pixel 74.

Figure 5:
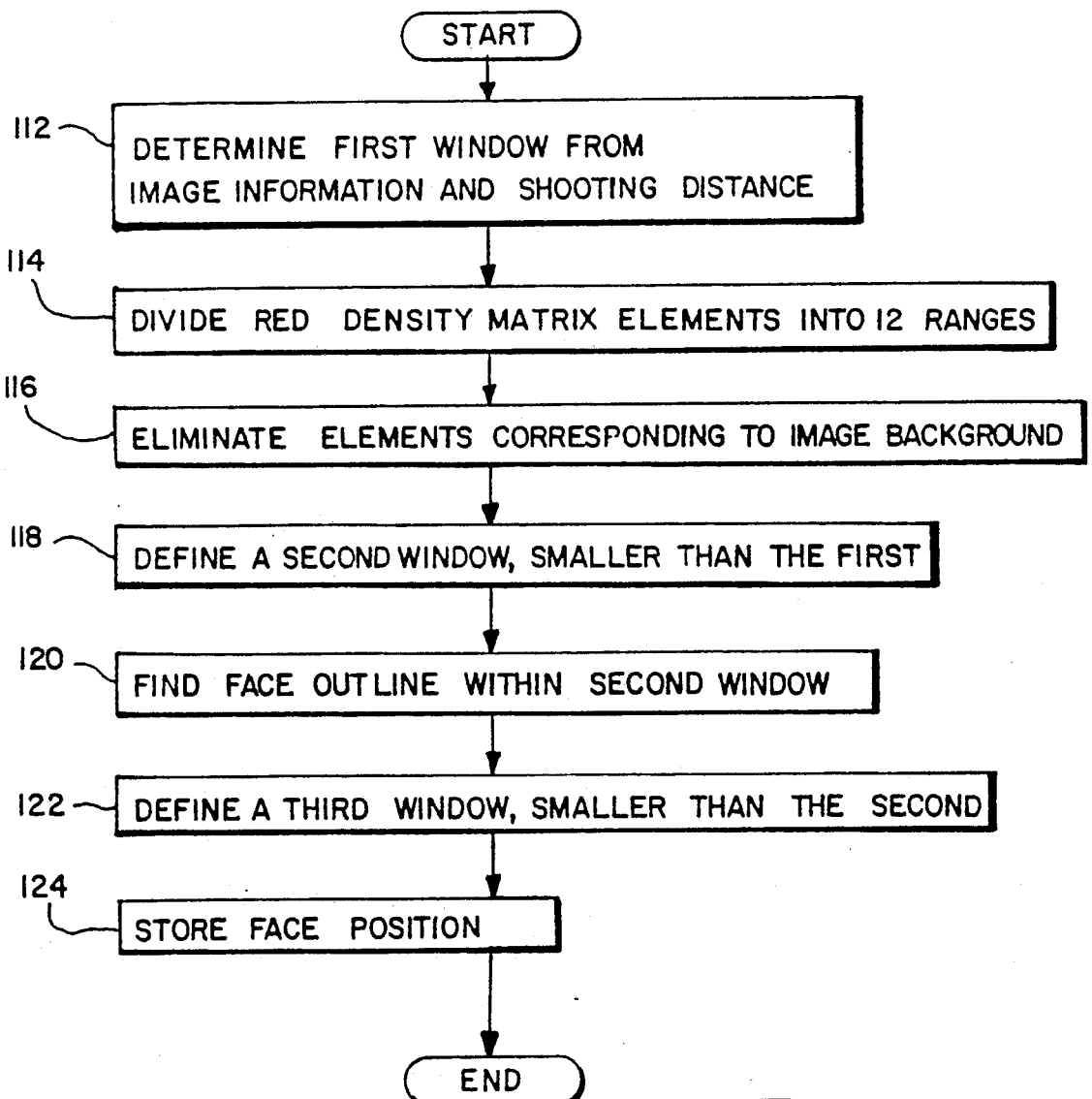
FIG. 5 is a flow chart illustrating the steps performed by a face finding routine.

Once the three matrices are created, scan routine 70 executes a face finding routine 80 illustrated in FIG. 5 by blocks 112-124. Face finding routine 80 determines where the student's face is positioned on the negative. The corresponding image information, together with the shooting distance, determines a first window indicating a general location and size of the face. Within the first window, face finding routine 80 executes an algorithm which uses the red density matrix to pinpoint the face location. The algorithm uses the red matrix since red is the dominant color in human faces. Within the first window, the red density values are divided into 12 ranges. The range containing the greatest number of matrix elements substantially corresponds to the image background and not to the face. These elements are eliminated from consideration. Each subsequent range containing the greatest number of elements is eliminated until a specified percentage of elements are left. In the preferred embodiment, 70% of the matrix elements are eliminated. The remaining matrix elements generally define a second window which is smaller than the first window.

The algorithm examines each element in the second window and searches for shifts in red densities. These shifts are representative of a general outline of the student's face. The general outline determines a third window which accurately indicates the position of the student's face on the negative. The third window is represented by starting and ending rows and starting and ending columns. The face position is then stored in RAM.

Next, scan routine 70 obtains facial color density averages for the third window (FIG. 3, block 106). The red, green and blue matrix elements that are within the third window are summed to obtain red, green and blue density averages. These averages are indicative of the student's facial color. The red, green, and blue density averages are stored in RAM along with the corresponding bar code information for that negative. Scan routine 70 has completed an analysis of one negative.

If there are more negatives to be analyzed, scan routine 70 reads a second bar code and scans a corresponding negative of a second student. Face finding routine 80 finds the position of the second student's face and determines red, green and blue densities for the second student's face. Scan routine 70 repeats this process until all negatives are analyzed.

Figure 6:
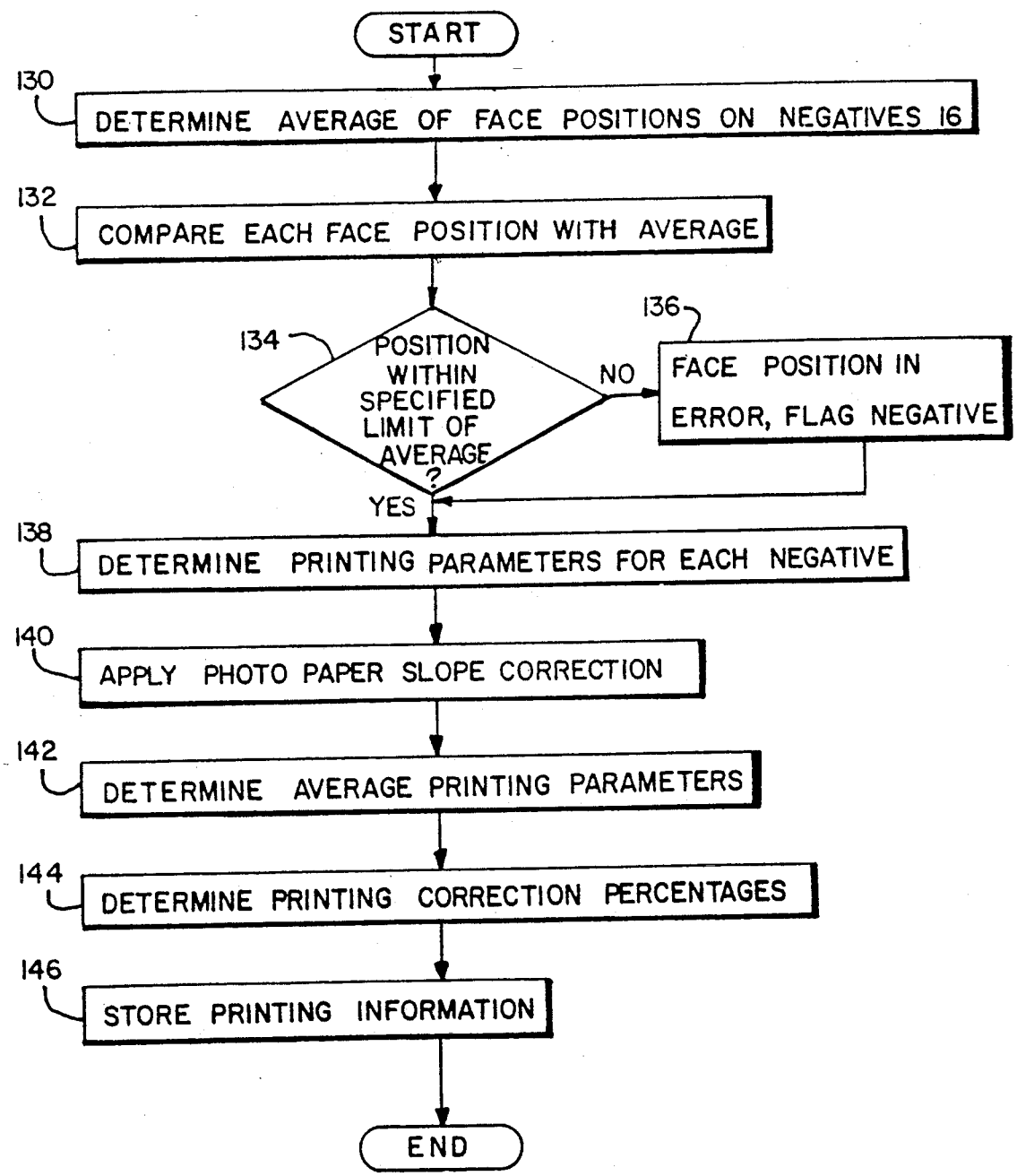
FIG. 6 is a flow chart illustrating the steps performed by a parameter calculation routine.

After all negatives have been analyzed, system 18 exits scan routine 70 and executes parameter calculation routine 82. FIG. 6 illustrates the steps performed by parameter calculation routine 82, indicated by blocks 130-146. Since all students in a particular class have their portraits taken with the same pose, scene type and shooting distance, their faces are positioned generally in the same location within each negative 16. This allows parameter calculation routine 82 to determine whether any errors were made when locating the faces of negatives 16. An average face location is calculated by averaging the stored individual starting and ending rows and columns in the third window. Each face location is compared to the average location and if the individual face is not within a specified limit of the average, the negative is flagged for special consideration.

The red, green and blue densities for each negative are converted to printing parameters used by printer 24 to control color content of each print. Photographic print paper is commercially available with a variety of slopes. Different emulsions of print paper react differently to colors of light. The print paper manufacturer provides slope measurements with the print paper that are indicative of these differences. In a preferred embodiment, a slope correction factor for the print paper is applied to the printing parameters for each negative. Parameter calculation routine 82 determines average printing parameters for the set of negatives 16 based upon the printing parameters of the individual negatives. These average printing parameters provide quality control information 62 generated by computer 44. Quality control information 62 can also include the photographer's identification number and a variety of other statistical information.

Next, parameter calculation routine 82 determines printing correction values, for each negative, which are percentage differences between the printing parameters for each negative and the average printing parameters for the set of negatives 16. The negatives which were flagged for determining the wrong face location are given printing correction values equal to the average printing parameters so that they may be printed at average printer settings. A printer operator may inspect these prints to verify color integrity.

Parameter calculation routine 82 then stores all printing information 20. Printing information 20 includes the average printing parameters, the printing correction values for each negative, and the corresponding bar code information for each negative.

Printing information 20 is transferred to computer 22 and negatives 16 are transferred to printer 24. Printing information 20 can be transferred by a variety of methods. In one method, the printing information 20 is stored on a flexible magnetic disk which is transferred to computer 22 to control printer 24 (as shown in FIG. 1). In an alternative method, computer 44 and computer 22 are coupled by a local-area-network which exchanges information through an electronic cable or a data bus.

FIG. 7 illustrates the steps performed by printer 24 and computer 22, indicated by blocks 150-168. After inserting the negatives 16 into printer 24, computer 22 reads the average printing parameters and initializes printer settings to correspond to the average printing parameters. Computer 22 instructs printer 24 to start advancing negatives 16 through the printer. Prior to printing each negative, computer 22 reads the corresponding individual printing correction values and adjusts printer 24 by the percentage difference indicated by the correction values. Printer 24 then makes a set of prints 26 on photographic print paper 28 for that negative. The steps of printing each negative are repeated until all negatives 16 are printed. Adjusting printer settings to each correction value ensures each print will have correct flesh tones.

The present invention simplifies the method of locating a principal subject by recording image information at the time of exposure. The image information provides a general indication of the location and size of the principal subject. In portraiture photography, the principal subject is the individual's face. The printer control settings are adjusted to give greater weight to the facial area so the prints obtained will have accurate flesh tones.

Although the present invention has been described with reference to preferred embodiments, workers skilled in the art will recognize that changes may be made in form and detail without departing from the spirit and scope of the invention.

What is claimed is:

1. A method of controlling a printer, the method comprising:
    exposing a frame of a photosensitive medium to an image having a principal subject;
    storing image information associated with each frame exposed, the image information being stored at generally the time of exposure and being representative of the principal subject location on each frame exposed;
    reading the stored image information;
    analyzing the exposed frame to determine image color density values on a point-by-point basis;
    determining printing parameters based upon the stored image information, the image color density values and the principal subject location; and
    printing the image on a hard copy medium based upon the printing parameters.

2. The method of claim 1 wherein exposing a frame to an image having a principal subject includes exposing the frame to an image having a principal subject with a face.

3. The method of claim 2 wherein determining printing parameters includes determining the face location.

4. The method of claim 3 wherein determining the face location includes defining a window containing the face based upon the image information.

5. The method of claim 3 wherein analyzing the exposed frame includes generating a red, a green, and a blue matrix representative of red, green, and blue colored densities, respectively, each matrix having elements representative of the point-by-point analysis.

6. The method of claim 5 wherein determining the face location further includes:
    dividing the red matrix elements into a plurality of density ranges;
    eliminating individual ranges containing greatest numbers of elements until a specified percentage of elements are eliminated from consideration, the eliminated elements representing a background of the image; and
    defining a window containing the face based upon the remaining elements.

7. The method of claim 6 wherein determining the face location further includes searching the red matrix for shifts in red density, the shifts indicating the face location.

8. The method of claim 3 wherein determining printing parameters further includes determining average color densities within the face location.

9. The method of claim 8 and further comprising the step of determining average printing parameters for a roll of film containing the exposed frame based upon individual frame printing parameters.

10. The method of claim 9 wherein printing the image further includes initializing printer settings to the average printing parameters.

11. The method of claim 10 and further comprising the step of determining printing correction percentages for individual frames as percentage differences between the individual frame printing parameters and the average printing parameters.

12. The method of claim 11 and further comprising the step of adjusting the printer settings based upon the individual frame printing correction percentages.

13. The method of claim 1 wherein storing image information includes storing a shooting distance.

14. The method of claim 1 wherein storing image information includes storing a scene type representative of the image exposed.

15. The method of claim 1 wherein storing image information includes storing a pose type representative of the image exposed.

16. The method of claim 1 wherein storing image information includes storing a shooting distance, a skin tone, a scene type, and a pose type, each representative of the image exposed.

17. The method of claim 1 wherein storing image information includes writing the image information as bar code information alongside the exposed frame.

18. The method of claim 17 wherein reading the stored image information includes reading the bar code information with a bar code reader electrically coupled to a computer.

19. The method of claim 1 wherein storing image information includes storing the image information on a job ticket and storing a reference number as bar code information alongside the exposed frame.

20. The method of claim 19 wherein reading the stored image information includes reading the reference number with a bar code reader electrically coupled to a computer and retrieving the image information based upon the corresponding job ticket.

21. The method of claim 1 wherein analyzing the exposed frame includes scanning the exposed frame with photo cells electrically coupled to a computer to generate digital representations of red, green, and blue matrices having matrix elements indicative of point-by-point red, green, and blue colored densities.

22. A method of controlling a printer, the method comprising:
    exposing a frame of a photosensitive medium to an image having a principal subject;
    storing image information associated with each frame exposed, the image information being stored at generally the time of exposure;
    reading the stored image information; determining principal subject position in the exposed frame based upon the stored image information;
    analyzing the exposed frame to determine color densities on a point-by-point basis;
    determining printing parameters based upon the point-by-point color densities within the principal subject position; and
    printing the image on a hard copy medium based upon the printing parameters.

23. The method of claim 22 wherein storing image information includes storing a shooting distance.

24. The method of claim 22 wherein storing image information includes storing a scene type representative of the image exposed.

25. The method of claim 22 wherein storing image information includes storing a pose type representative of the image exposed.

26. The method of claim 22 wherein storing image information includes storing a shooting distance, a skin tone, a scene type, and a pose type, each representative of the image exposed.

27. The method of claim 22 wherein storing image information includes writing the image information as bar code information alongside the exposed frame.

28. The method of claim 27 wherein reading the stored image information includes reading the bar code information with a bar code reader electrically coupled to a computer.

29. The method of claim 22 wherein analyzing the exposed frame includes scanning the exposed frame with photo cells electrically coupled to a computer to generate digital representations of red, green, and blue matrices having matrix elements indicative of point-by-point red, green, and blue colored densities.

30. The method of claim 22 wherein determining principal subject position includes defining a window containing the principal subject based upon the image information.

31. The method of claim 22 wherein exposing a frame to an image includes exposing the frame to an image having a principal subject with a face.

32. The method of claim 31 wherein determining printing parameters includes determining the face location.

33. The method of claim 32 wherein analyzing the exposed frame includes generating a red, a green, and a blue matrix representative of red, green, and blue colored densities, respectively, each matrix having elements representative of the point-by-point analysis.

34. The method of claim 33 wherein determining the face location includes:
dividing the red matrix elements into a plurality of density ranges;
eliminating individual ranges containing greatest numbers of elements until a specified percentage of elements are eliminated from consideration, the eliminated elements representing a background of the image; and
defining a window containing the face based upon the remaining elements.

35. The method of claim 34 wherein determining the face location includes searching the red matrix for shifts in red density, the shifts indicating the face location.

36. The method of claim 32 wherein determining printing parameters includes determining average color densities within the face location.

37. The method of claim 36 and further comprising the step of determining average printing parameters for a roll of film containing the exposed frame based upon individual frame printing parameters.

38. The method of claim 37 wherein printing the image includes initializing printer settings to the average printing parameters.

39. The method of claim 38 and further comprising the step of determining printing correction percentages for individual frames as percentage differences between the individual frame printing parameters and the average printing parameters.

40. The method of claim 39 and further comprising the step of adjusting the printer settings based upon the individual printing correction percentages.

41. A printer control method comprising:
exposing a frame of a photosensitive medium to an image having a principal subject with flesh tones;
storing image information representative of flesh tone locations within the exposed frame, the image information being stored at generally the time of exposure;
analyzing the exposed frame to determine color density values on a point-by-point basis;
reading the stored image information;
determining printing parameters based upon the image information and the color density values within the flesh tone locations; and
printing the image on a hard copy medium based upon the printing parameters to obtain a print having accurate flesh tones.

42. The method of claim 41 Wherein exposing a frame to an image includes exposing the frame to an image having a principal subject with a face.

43. The method of claim 42 wherein determining proper printing parameters includes determining the face location.

44. The method of claim 41 and further comprising the step of defining a first window containing the flesh tone locations based upon the image information.

45. The method of claim 44 wherein analyzing the exposed frame includes generating a red, a green, and a blue matrix representative of red, green, and blue colored densities, respectively, each matrix having elements representative of the point-by-point analysis.

46. The method of claim 45 and further comprising the steps of:
dividing the red matrix elements within the first window into a plurality of density ranges;
eliminating individual ranges containing greatest numbers of elements until a specified percentage of elements are eliminated from consideration, the eliminated elements representing a background of the image; and
defining a second window containing the flesh tone locations based upon the remaining elements.

47. The method of claim 46 and further comprising the step of searching the red matrix for shifts in red density, the shifts indicating the flesh tone locations.

48. The method of claim 41 wherein storing image information includes storing a shooting distance.

49. The method of claim 41 wherein storing image information includes storing a scene type representative of the image exposed.

50. The method of claim 41 wherein storing image information includes storing a pose type representative of the image exposed.

51. The method of claim 41 wherein storing image information includes storing a shooting distance, a skin tone, a scene type, and a pose type, each representative of the image exposed.

52. The method of claim 41 wherein storing image information includes writing the image information as bar code information alongside the exposed frame.

53. The method of claim 52 wherein reading the stored image information includes reading the bar code information with a bar code reader electrically coupled to a computer.

54. The method of claim 41 wherein analyzing the exposed frame includes scanning the exposed frame with photo cells electrically coupled to a computer to generate digital representations of red, green, and blue matrices having matrix elements indicative of point-by-point red, green, and blue colored densities.

United States Patent Office

PTO - BOYERS, PA Duty Station

MISSING PAGE TEMPORARY NOTICE

PATENT # 5029312   FOR ISSUE DATE 7-2-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 11 to end

Not Available at Boyers, Pa.

10-4-93

Data Conversion Operation
Boyers, Pa

UNITED STATES PATENT AND TRADEMARK OFFICE
CERTIFICATE OF CORRECTION

PATENT NO. : 5,029,312
DATED : July 2, 1991
INVENTOR(S) : Gary L. Goenner It is certified that error appears in the above-identified patent and that said Letters Patent is hereby corrected as shown below:

Col. 10, line 14, delete "Wherein", insert --wherein--.

Signed and Sealed this

Twenty-ninth Day of December, 1992

*Attest:*

DOUGLAS B. COMER

*Attesting Officer*   *Acting Commissioner of Patents and Trademarks*